US012613411B2

(12) United States Patent
Nishio et al.

(10) Patent No.: US 12,613,411 B2
(45) Date of Patent: Apr. 28, 2026

(54) VEHICLE CONTROL METHOD AND DISPLAY DEVICE

(71) Applicant: PANASONIC AUTOMOTIVE SYSTEMS CO., LTD., Kanagawa (JP)

(72) Inventors: Tsuyoshi Nishio, Chiba (JP); Toshihiro Miyamichi, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 272 days.

(21) Appl. No.: 18/645,019

(22) Filed: Apr. 24, 2024

(65) Prior Publication Data

US 2024/0361593 A1     Oct. 31, 2024

(30) Foreign Application Priority Data

Apr. 26, 2023     (JP) ................................. 2023-072554

(51) Int. Cl.
G02B 27/01          (2006.01)

(52) U.S. Cl.
CPC .. G02B 27/0101 (2013.01); G02B 2027/0118 (2013.01); G02B 2027/014 (2013.01)

(58) Field of Classification Search
USPC .......................................................... 349/16
See application file for complete search history.

(56) References Cited

FOREIGN PATENT DOCUMENTS

| JP | 2004-271830 A | 9/2004 | |
| JP | 2010-160309 A | 7/2010 | |
| WO | WO-2020195625 A1 * | 10/2020 | ............. B60K 35/53 |

* cited by examiner

*Primary Examiner* — Phu Vu
(74) *Attorney, Agent, or Firm* — GREENBLUM & BERNSTEIN, P.L.C.

(57)          ABSTRACT

A display device includes a transparent display and having a first display region capable of outputting a video of a first shape, and a variable light transmittance sheet which corresponds to at least the first display region, is disposed on at least a front seat side of the vehicle body, and has a variable light transmittance. When outputting a video including a second display region having a second shape in the first display region, the variable light transmittance sheet is set to include a light-shielding region having a third shape and having a first light transmittance, and a transmission region having a fourth shape other than the light-shielding region and having a second light transmittance larger than the first light transmittance, and at least a part of the light-shielding region is set to overlap with the second display region.

20 Claims, 10 Drawing Sheets

VEHICLE CONTROL METHOD AND DISPLAY DEVICE

TECHNICAL FIELD

The present disclosure relates to a vehicle control method and a display device.

BACKGROUND ART

Patent Literature 1 discloses a head-up display (HUD) device for a vehicle, and the HUD device includes a transparent EL display and a light modulation plate which is disposed on a back surface side of the transparent EL display and can adjust a transmittance, and a control IC controls the transmittance of the light modulation plate and the luminance of EL.

CITATION LIST

Patent Literature

Patent Literature 1: JP2004-271830A
Patent Literature 2: JP2010-160309A

SUMMARY OF INVENTION

When the transparent display as disclosed in Patent Literature 1 is disposed not on a dashboard but at a position behind a driver, the light of an image displayed on the transparent display may leak from the back surface side and affect the driving of the driver.

An object of the present disclosure is to prevent the light of an image displayed on a transparent display from affecting the driving of a driver.

One aspect of the present disclosure provides a vehicle control method for a vehicle, the vehicle including: at least a first wheel coupled to a vehicle body; a second wheel coupled to the vehicle body; a third wheel coupled to the vehicle body; and a fourth wheel coupled to the vehicle body. The vehicle being capable of traveling in a predetermined direction using the first wheel, the second wheel, the third wheel, and the fourth wheel. The vehicle body includes a floor surface portion and a ceiling surface portion arranged along the predetermined direction; a left side surface portion connecting the floor surface portion and the ceiling surface portion and arranged on a left side surface along the predetermined direction; a right side surface portion connecting the floor surface portion and the ceiling surface portion and arranged on a right side surface along the predetermined direction; a front surface portion connecting the floor surface portion and the ceiling surface portion and arranged in a front portion along the predetermined direction; a rear surface portion connecting the floor surface portion and the ceiling surface portion and arranged in a rear portion along the predetermined direction; at least one front seat disposed closer to a front surface portion side than the rear surface portion on the floor surface portion; at least one rear seat disposed closer to a rear surface portion side than the front surface portion on the floor surface portion; and a transparent display disposed between the rear seat and the front seat, having a first display region capable of outputting a video of a first shape, and including a variable light transmittance sheet. The variable light transmittance sheet corresponded to at least the first display region, being disposed on at least a front seat side, and having a variable light transmittance. The vehicle control method includes, when outputting a video including a second display region having a second shape in the first display region, setting the variable light transmittance sheet to include a light-shielding region having a third shape and a transmission region having a fourth shape other than the light-shielding region, the light-shielding region having a first light transmittance, and the transmission region having a second light transmittance larger than the first light transmittance, and setting at least a part of the light-shielding region to overlap with the second display region.

Further, one aspect of the present disclosure a display device mounted on a vehicle capable of traveling in a predetermined direction using a first wheel coupled to a vehicle body, a second wheel coupled to the vehicle body, a third wheel coupled to the vehicle body, and a fourth wheel coupled to the vehicle body. The display device includes a transparent display disposed between a rear seat of the vehicle body and a front seat of the vehicle body and having a first display region capable of outputting a video of a first shape. The transparent display includes a variable light transmittance sheet which corresponds to at least the first display region, is disposed on at least the front seat side of the vehicle body, and has a variable light transmittance. The variable light transmittance sheet includes a light-shielding region having a third shape and having a first light transmittance, and a transmission region having a fourth shape other than the light-shielding region and having a second light transmittance larger than the first light transmittance. When outputting a video including a second display region having a second shape in the first display region, at least a part of the light-shielding region is set to overlap with the second display region.

According to the present disclosure, it is possible to prevent the light of the image displayed on the transparent display from affecting the driving of the driver.

DESCRIPTION OF EMBODIMENTS

Hereinafter, an embodiment of the present disclosure will be described in detail with reference to the drawings as appropriate. However, the more detailed description may be omitted. For example, the detailed description of already well-known matters and the redundant description of substantially the same configuration may be omitted. This is to avoid the following description from being unnecessarily redundant and facilitate understanding by those skilled in the art. The accompanying drawings and the following description are provided for those skilled in the art to fully understand the present disclosure, and are not intended to limit the subject matter described in the claims.

Embodiment 1

Figure 1:
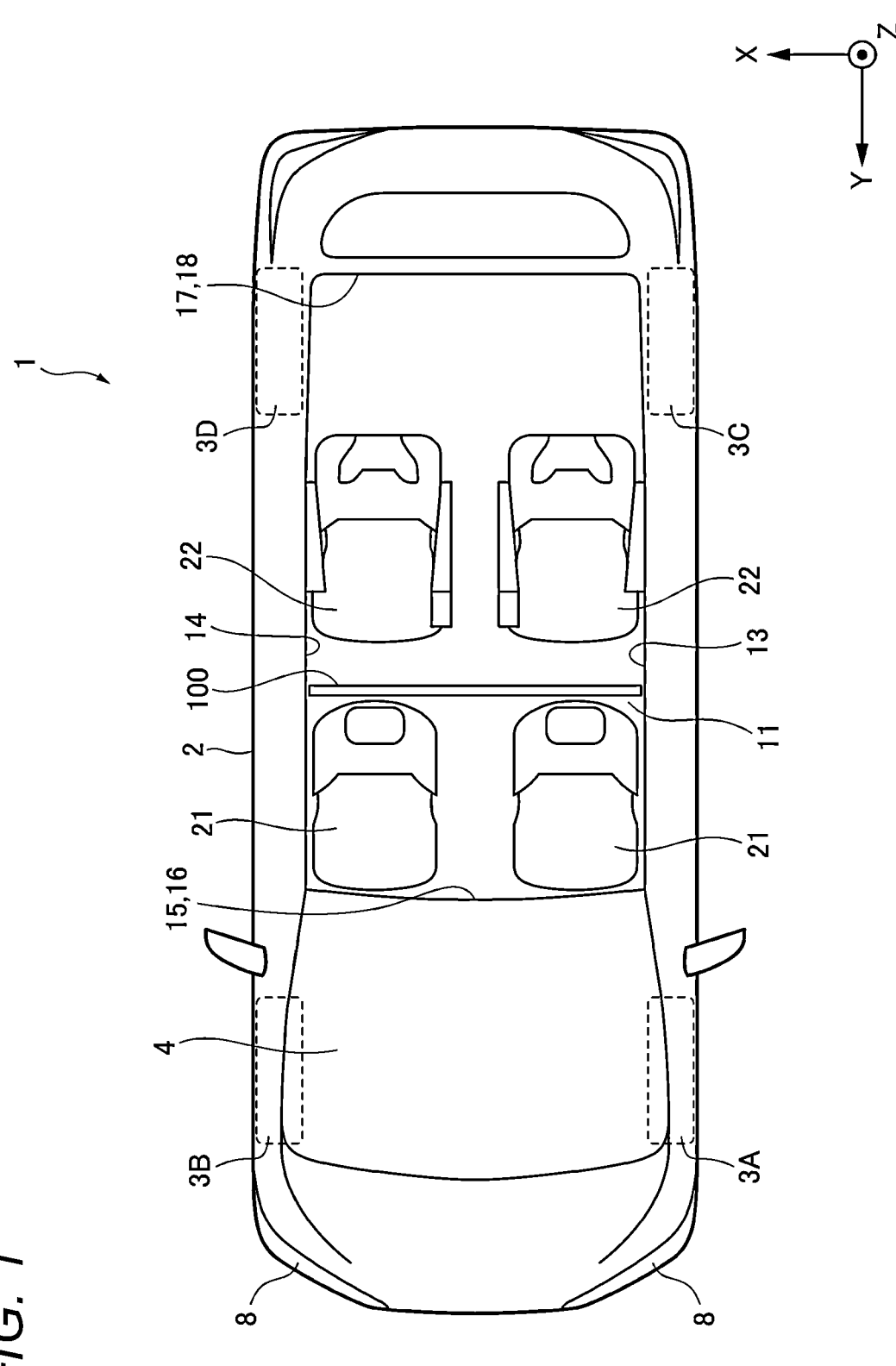
FIG. 1 is a plan view illustrating a configuration example of a vehicle according to Embodiment 1, as seen through a vehicle interior from above.
Figure 2:
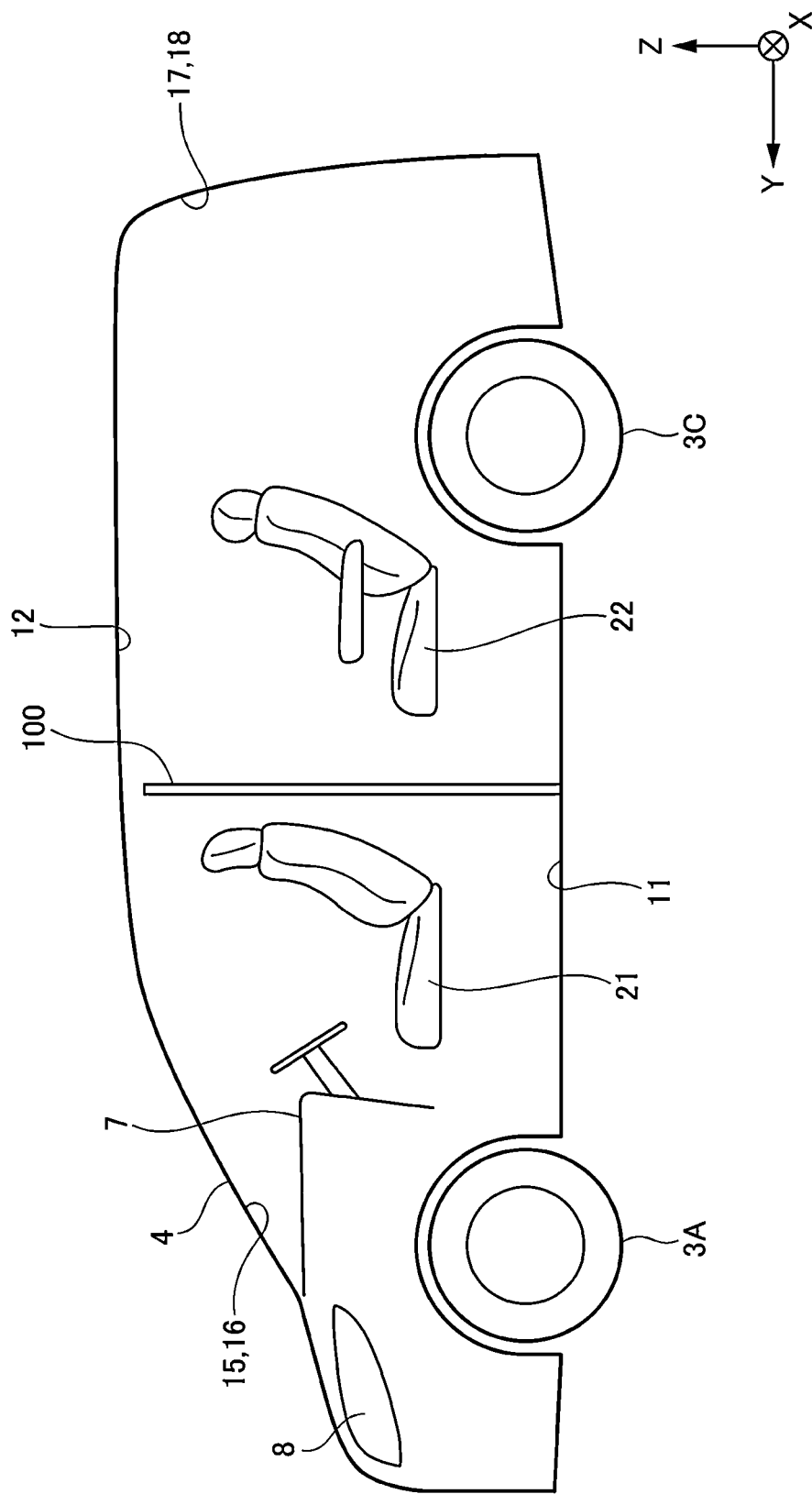
FIG. 2 is a side view illustrating a configuration example of the vehicle according to Embodiment 1, as seen through the vehicle interior from the side.

<Configuration of Vehicle>
FIG. 1 is a plan view illustrating a configuration example of a vehicle 1 according to Embodiment 1, as seen through a vehicle interior from above. FIG. 2 is a side view illustrating a configuration example of the vehicle 1 according to Embodiment 1, as seen through the vehicle interior from the side. Next, the configuration of the vehicle 1 will be described with reference to FIGS. 1 and 2.

For convenience of description, as illustrated in FIGS. 1 and 2, an entire length direction of the vehicle 1 is defined as a Y axis, a width direction of the vehicle 1 is defined as an X axis, and a height direction of the vehicle 1 is defined as a Z axis. For convenience of description, a positive direction of the Z axis may be referred to as "upper", a negative direction of the Z axis may be referred to as "lower", a positive direction of the Y axis may be referred to as "front", a negative direction of the Y axis may be referred to as "rear", a positive direction of the X axis may be referred to as "right", and a negative direction of the X axis may be referred to as "left". Expressions related to these directions are used for convenience of description, and are not intended to limit a posture during actual use of this structure.

The vehicle 1 includes at least a first wheel 3A, a second wheel 3B, a third wheel 3C, and a fourth wheel 3D, which are connected to a vehicle body 2. The vehicle 1 can travel in a predetermined direction (for example, a Y-axis direction) using the first wheel 3A, the second wheel 3B, the third wheel 3C, and the fourth wheel 3D. However, the vehicle 1 is not limited to the configuration including four wheels, and may be a configuration including two or three wheels or five or more wheels. The vehicle 1 may be a private car, a commercial car, a taxi, a truck, a bus, or the like.

The vehicle body 2 includes a floor surface portion 11 and a ceiling surface portion 12 arranged along the predetermined direction.

The vehicle body 2 includes a left side surface portion 13 connecting the floor surface portion 11 and the ceiling surface portion 12 and arranged on a left side surface along the predetermined direction and a right side surface portion 14 connecting the floor surface portion 11 and the ceiling surface portion 12 and arranged on a right side surface along the predetermined direction.

The vehicle body 2 includes a front surface portion 16 connecting the floor surface portion 11 and the ceiling surface portion 12 and arranged in a front portion 15 along the predetermined direction and a rear surface portion 18 connecting the floor surface portion 11 and the ceiling surface portion 12 and arranged in a rear portion 17 along the predetermined direction.

The vehicle body 2 includes at least one front seat 21 disposed closer to a front surface portion 16 side than the rear surface portion 18 on the floor surface portion 11 and at least one rear seat 22 disposed closer to a rear surface portion 18 side than the front surface portion 16 on the floor surface portion 11.

The front surface portion 16 of the vehicle 1 includes a front window 4 made of glass that allows the outside of the vehicle to be visually recognized from the front seat 21 in the predetermined direction.

The vehicle body 2 includes a display device 100 disposed between the rear seat 22 and the front seat 21. A passenger in the rear seat 22 can view a video 200 displayed on the display device 100. The video 200 may be either a still image or a moving image. The display device 100 may be disposed at a position different from the position between the rear seat 22 and the front seat 21. For example, the display device 100 may be disposed along the left side surface portion 13 or the right side surface portion 14. For example, the display device 100 may be disposed between two rear seats 22. For example, when the vehicle 1 includes three-row seats, the display device 100 may be disposed between the rear seat 22 in the second row and a rear seat (not illustrated) in the third row. The details of the display device 100 will be described later.

Figure 3A:
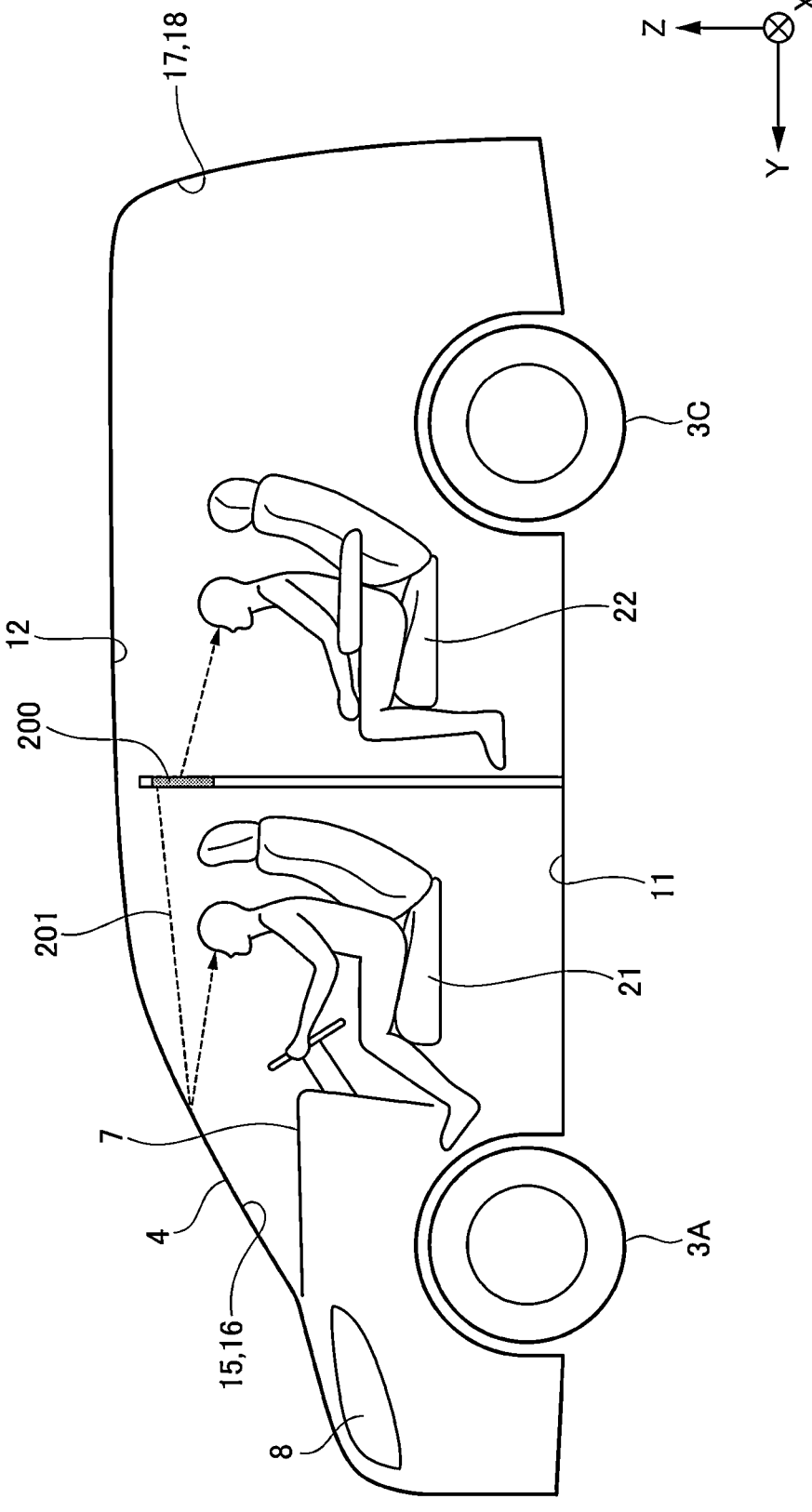
FIG. 3A is a diagram illustrating a first example of a case in which a video is displayed on a transparent display in the related art.
Figure 3B:
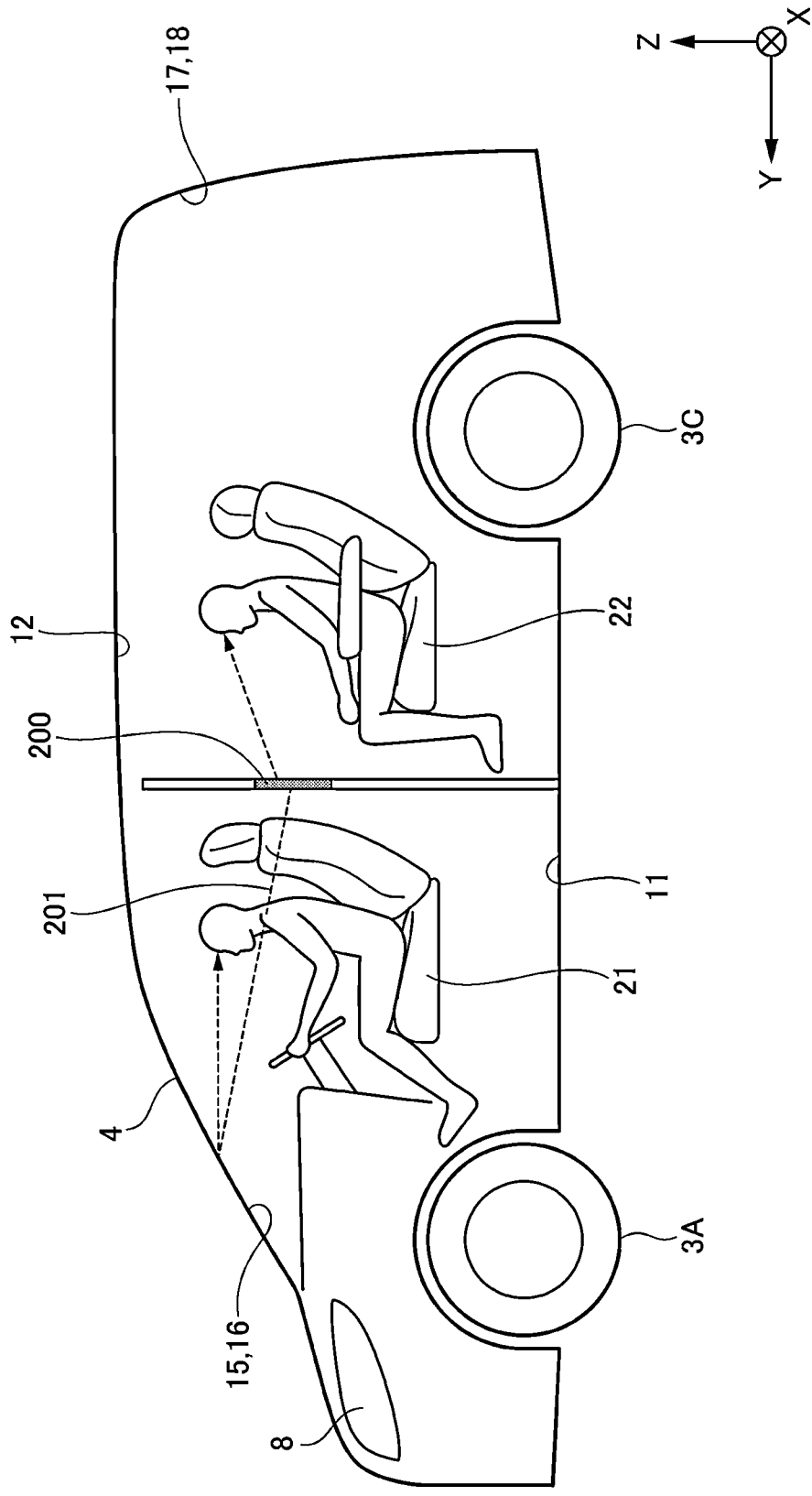
FIG. 3B is a diagram illustrating a second example of a case in which the video is displayed on the transparent display in the related art.

Next, with reference to FIGS. 3A and 3B, a problem in a case in which the display device 100 disposed between the rear seat 22 and the front seat 21 is a transparent display and a video is displayed on the transparent display will be described. FIG. 3A is a diagram illustrating a first example of a case in which the video 200 is displayed on a transparent display in the related art. FIG. 3B is a diagram illustrating a second example of a case in which the video 200 is displayed on the transparent display in the related art.

The transparent display includes a self-luminous display. Examples of the self-luminous display include an organic electro-luminescence (EL) display and a light emitting diode (LED) display.

When the video 200 is displayed on the transparent display, the light of the video 200 is emitted not only to the rear seat 22 but also to the front seat 21. The light of the video 200 emitted to the front seat 21 may be reflected by the front window 4 and reach a field of view of a driver in the front seat 21 as illustrated in FIG. 3A or FIG. 3B. This may affect the driving of the driver, and thus is required to be prevented.

Figure 4:
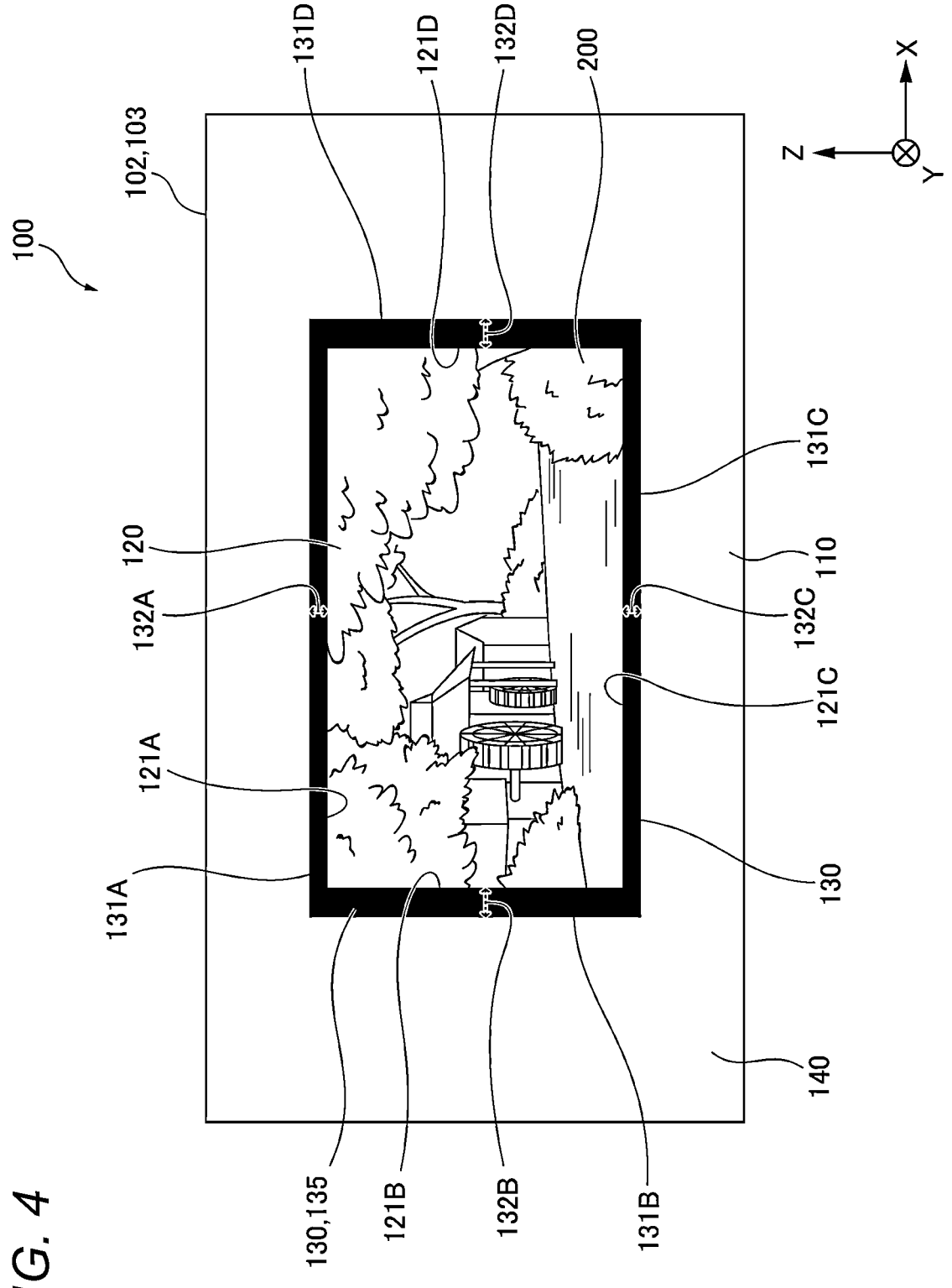
FIG. 4 is a front view illustrating a configuration example of a display device according to Embodiment 1.
Figure 5:
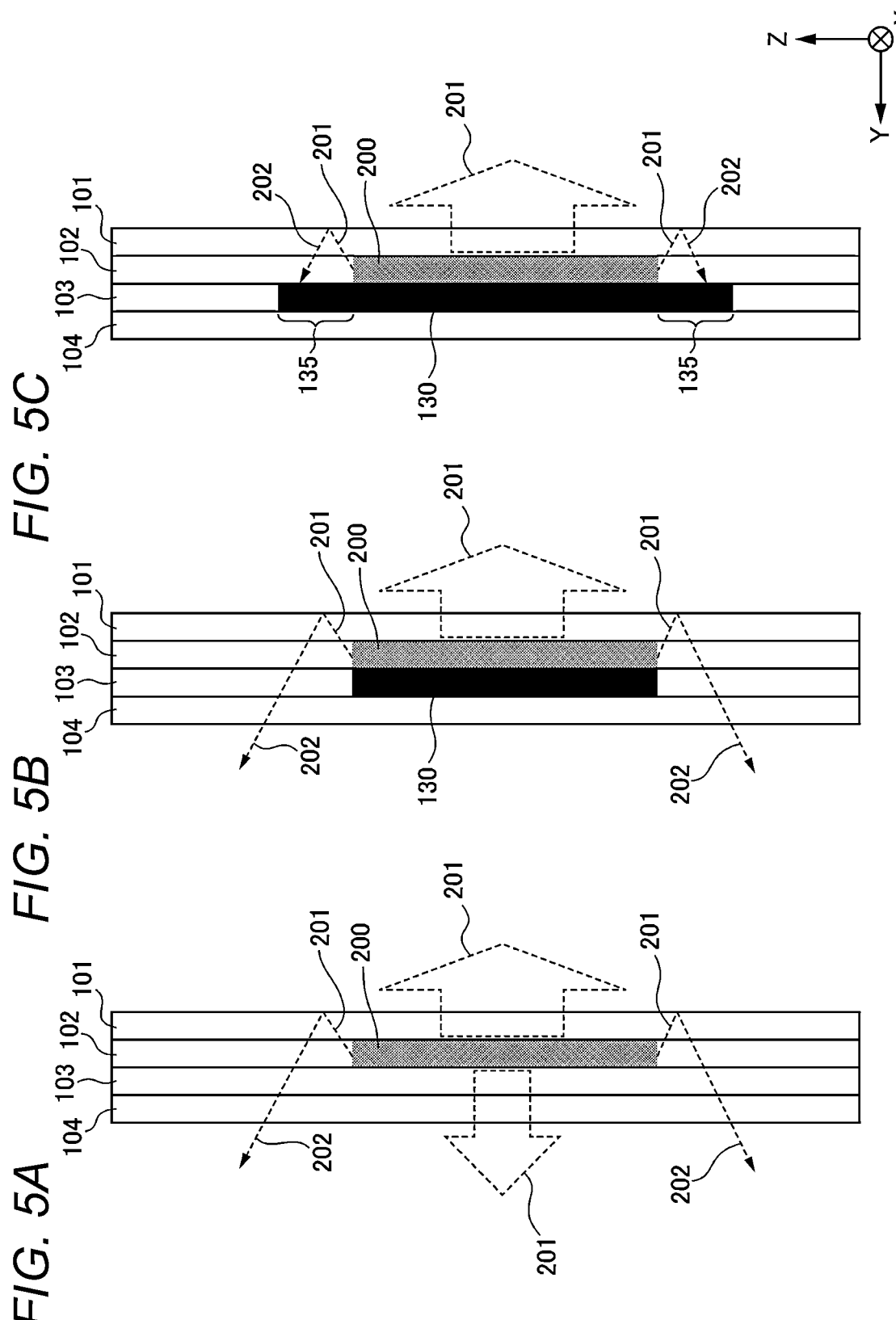
FIGS. 5A to 5C are side views illustrating a configuration example of the display device according to Embodiment 1.

The present embodiment provides a vehicle control method and the display device 100 that can prevent the light of the video 200 displayed on the transparent display from affecting the driving of the driver. Hereinafter, the details will be described.
<Display Device>
FIG. 4 is a front view illustrating a configuration example of the display device 100 according to Embodiment 1. FIGS. 5A to 5C are side views illustrating a configuration example of the display device 100 according to Embodiment 1. FIG. 5A illustrates an example in which no light-shielding region 130 is set. FIG. 5B illustrates an example in which the light-shielding region 130 overlapping a second display region 120 is set. FIG. 5C illustrates an example in which the light-shielding region 130 larger than the second display region 120 is set.

As illustrated in FIGS. 5A to 5C, the display device 100 includes a first protective cover 101, a transparent display 102, a variable light transmittance sheet 103, and a second protective cover 104 in this order from the rear seat 22 toward the front seat 21 (in the positive direction of the Y axis). That is, the transparent display 102 is disposed on a rear seat 22 side, and the variable light transmittance sheet 103 is disposed on a front seat 21 side. Hereinafter, a surface of the transparent display 102 on the rear seat 22 side may be referred to as a front surface, and a surface on the front seat 21 side may be referred to as a back surface.

The first protective cover 101 and the second protective cover 104 are formed of a transparent member such as glass.

The transparent display 102 may include a self-luminous display. Examples of the self-luminous display include an organic EL display and an LED display.

As illustrated in FIG. 4, the transparent display 102 includes a first display region 110 capable of outputting a video of a first shape. The first shape may be a square. However, the first shape is not limited to the square, and may be any shape. The variable light transmittance sheet 103 corresponds to the first display region 110.

The variable light transmittance sheet 103 includes at least a liquid crystal shutter, and a light transmittance of any region can be changed by adjusting the opening and closing of the liquid crystal shutter of the any region.

The variable light transmittance sheet 103 may be set with the light-shielding region 130 having a third shape and having a first light transmittance and a transmission region 140 having a fourth shape and having a second light transmittance larger than the first light transmittance. That is, the light-shielding region 130 does not transmit much light, and the transmission region 140 sufficiently transmits light. For example, the first light transmittance may be 10% or less, and the second light transmittance may be 50% or more.

The video 200 including the second display region 120 having a second shape may be output in the first display region 110 of the transparent display 102. In this case, as illustrated in FIG. 5B, the variable light transmittance sheet 103 may be set such that the light-shielding region 130 overlaps the second display region 120. Alternatively, as illustrated in FIG. 4 and FIG. 5C, the variable light transmittance sheet 103 may be set such that a part of the light-shielding region 130 overlaps the second display region 120 (that is, the light-shielding region 130 is larger than the second display region 120).

Hereinafter, when the transparent display 102 is viewed from the surface, portions of the light-shielding region 130 not overlapping the second display region 120 (that is, portions of the light-shielding region 130 protruding from the second display region 120) may be referred to as light-shielding frames 135.

By setting the light-shielding frames 135 in this manner, the following operation and effect can be obtained. That is, as illustrated in FIGS. 5B and 5C, of the light of the video 200 (hereinafter referred to as video light 201) output to the second display region 120, the video light 201 to be output from the back surface (that is, in the Y direction) is shielded by the light-shielding region 130. Further, as illustrated in FIG. 5C, of the light of the video 200 (hereinafter referred to as the video light 201) output to the second display region 120, the light reflected by the first protective cover 101 (hereinafter referred to as video reflection light 202) is shielded by the light-shielding frames 135. Therefore, it is possible to prevent the video reflection light 202 from being reflected by the front window 4 and entering the field of view of the driver in the front seat 21 to affect the driving.

In addition, by setting the transmission region 140 in the transparent display 102, the passenger in the rear seat 22 can view the outside of the vehicle through the transmission region 140. Accordingly, the passenger in the rear seat 22 can obtain a feeling of releasing the field of view, and can be prevented from becoming car sickness.

Next, the second display region 120 and the light-shielding region 130 will be described in more detail.

As illustrated in FIG. 4, the second shape of the second display region 120 is, for example, a square, and includes four sides 121A, 121B, 121C, and 121D. The sides 121A and 121C may be arranged along a horizontal direction, and the sides 121B and 121D may be arranged along a vertical direction. However, the second shape is not limited to the square, and may be any shape.

The third shape of the light-shielding region 130 is, for example, a square, and includes four sides 131A, 131B, 131C, and 131D. The sides 131A and 131C may be arranged along the horizontal direction, and the sides 131B and 131D may be arranged along the vertical direction. However, the third shape is not limited to the square, and may be any shape.

The sides 121A, 121B, 121C, and 121D of the second shape of the second display region 120 are arranged corresponding to the sides 131A, 131B, 131C, and 131D of the third shape of the light-shielding region 130, respectively. The sides 131A, 131B, 131C, and 131D of the third shape of the light-shielding region 130 may be located between sides 121A, 121B, 121C, and 121D of the second shape of the second display region 120 and the transmission region 140, respectively.

The side 131A of the third shape of the light-shielding region 130 may be separated from the side 121A of the second shape of the second display region 120 by a predetermined frame distance 132A. The side 131B of the third shape of the light-shielding region 130 may be separated from the side 121B of the second shape of the second display region 120 by a predetermined frame distance 132B. The side 131C of the third shape of the light-shielding region 130 may be separated from the side 121C of the second shape of the second display region 120 by a predetermined frame distance 132C. The side 131D of the third shape of the light-shielding region 130 may be separated from the side 121D of the second shape of the second display region 120 by a predetermined frame distance 132D.

At least two of the frame distance 132A, the frame distance 132B, the frame distance 132C, and the frame distance 132D may have a common value or may have different values.

At least one of the frame distance 132A, the frame distance 132B, the frame distance 132C, and the frame distance 132D may be zero. For example, when all of the frame distance 132A, the frame distance 132B, the frame distance 132C, and the frame distance 132D are set to zero, the second display region 120 and the light-shielding region 130 are set to overlap each other as illustrated in FIG. 5B.

Figure 6:
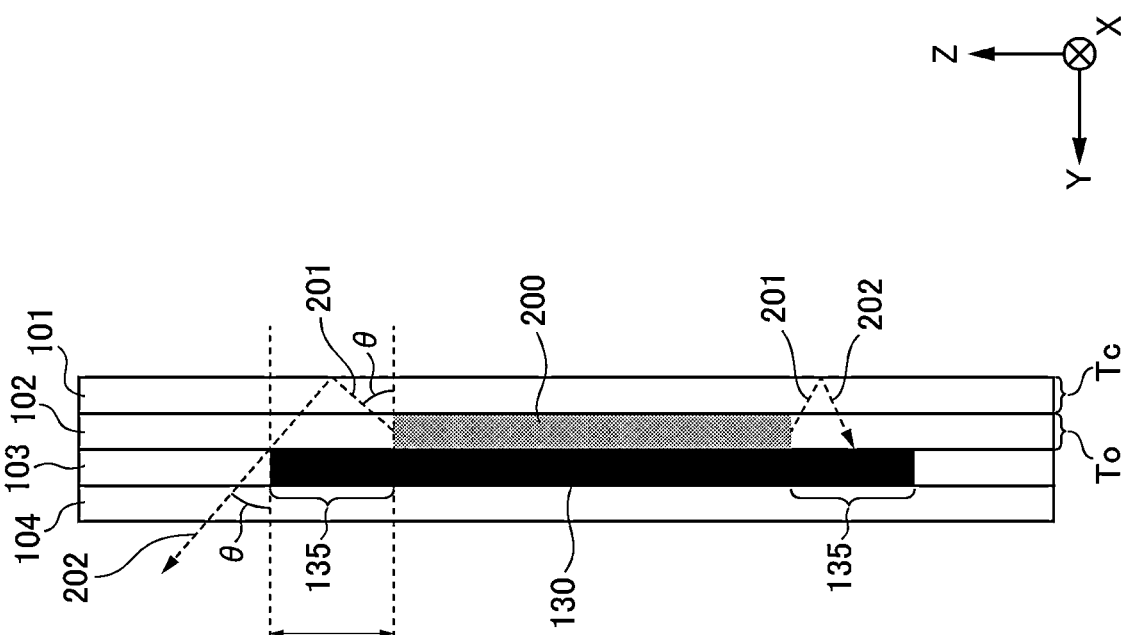
FIG. 6 is a side view of the display device according to Embodiment 1, and is a view illustrating an example of a method for determining a frame distance.

FIG. 6 is a side view of the display device 100 according to Embodiment 1, and is a view illustrating an example of a method for determining the frame distance 132A. The description is also applied to the frame distances 132B, 132C, and 132D.

A thickness of the transparent display 102 is referred to as To, and a thickness of the first protective cover 101 is referred to as Tc. When viewed from the side 121A of the second display region 120, an angle with respect to a target (hereinafter, referred to as an avoidance target) to which the video reflection light 202 of the video light 201 output from the video 200 of the second display region 120 is to be avoided from reaching is referred to as θ. Examples of the avoidance target include the front window 4. This is because, as described above, when the video reflection light 202 reaches the front window 4, the video reflection light 202 may be reflected by the front window 4 and enter the field of view of the driver. However, the avoidance target is not limited to the front window 4, and may be a front door window, a room mirror, or the like.

In this case, the frame distance 132A may be determined as in the following Formula 1.

$$\text{Frame distance } 132A \geq (2Tc + To) \times \tan\theta \qquad \text{(Formula 1)}$$

Accordingly, the video reflection light 202 is shielded by the light-shielding frames 135 having the frame distance 132A, and thus does not reach the avoidance target. Therefore, the video reflection light 202 can be prevented from entering the field of view of the driver.

An amount of light decreases as the angle θ of the video reflection light 202 increases, and thus the minimum value of θ may be a value in a case in which the amount of light of the video reflection light 202 sufficiently decreases to the extent that the driving is not affected.

Figure 7:
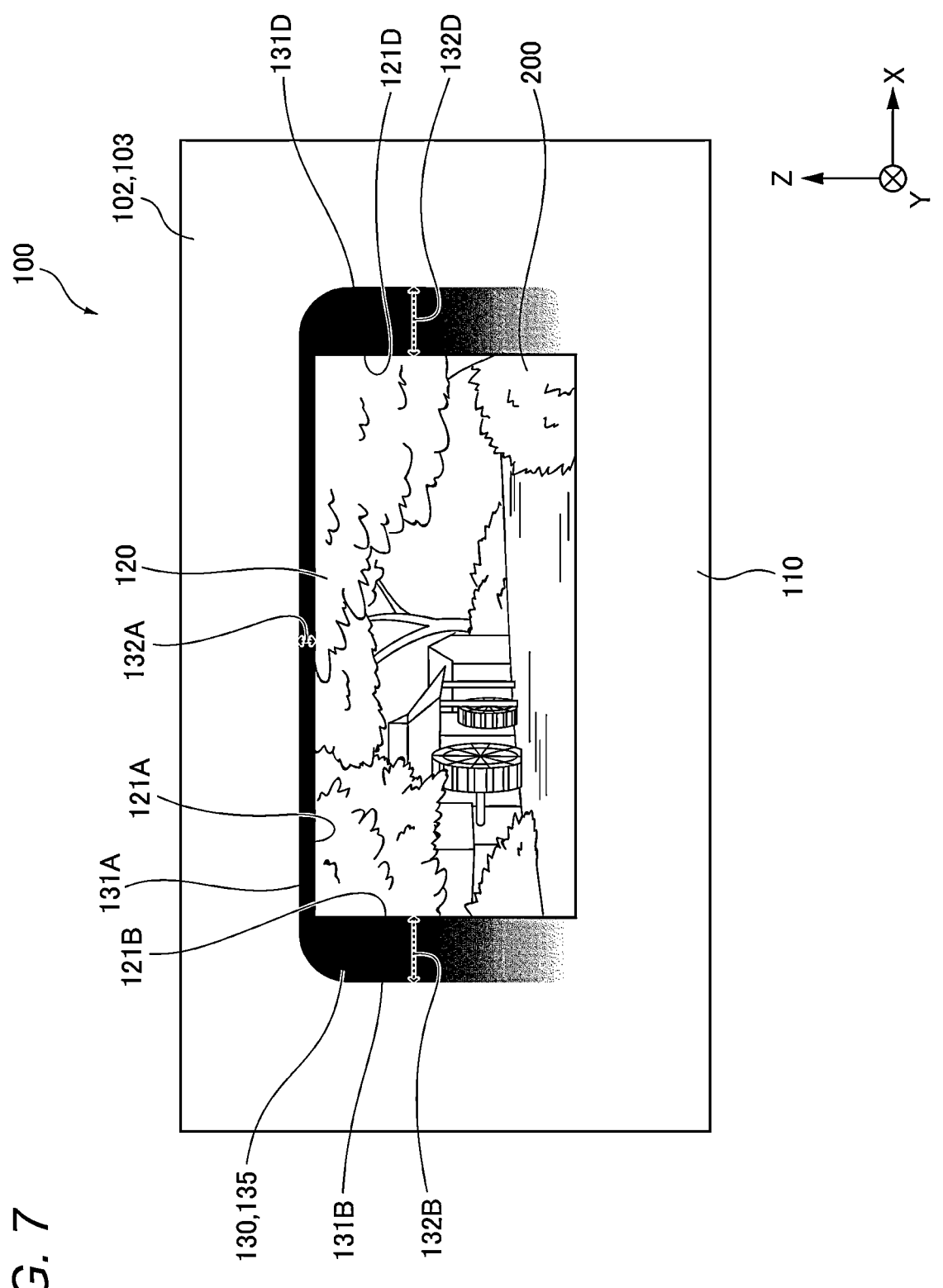
FIG. 7 is a front view of the display device according to Embodiment 1, and is a view illustrating a case in which a light transmittance of light-shielding frames is gradated.

FIG. 7 is a front view of the display device 100 according to Embodiment 1, and is a view illustrating a case in which a light transmittance of the left and right light-shielding frames 135 is gradated.

The light transmittance of the light-shielding frames 135 does not need to be constant, and for example, as illustrated in FIG. 7, the left and right light-shielding frames 135 (that is, the light-shielding frames 135 corresponding to the frame distance 132B and the frame distance 132D) may be set such that the light transmittance increases toward the bottom.

As described above, by setting the light transmittance of at least a part of the light-shielding frame 135 to be gradated, it is possible to prevent the feeling of releasing the field of view of the passenger in the rear seat 22 from being impaired by the light-shielding region 130.

Further, as illustrated in FIG. 7, the light-shielding frames 135 may not be set below the second display region 120. That is, the frame distance 132C may be set to zero. This is because the video reflection light 202 of the video light 201 output from the vicinity of the side 121C of the second display region 120 may be shielded by the front seat 21 or the like depending on the position of the second display region 120, and may not reach the avoidance target.

As described above, since the light-shielding frame 135 is not set for at least one of the sides 121A, 121B, 121C, and 121D of the second display region 120, it is possible to prevent the feeling of releasing the field of view of the passenger in the rear seat 22 from being impaired by the light-shielding region 130.

<System Configuration>

Figure 8:
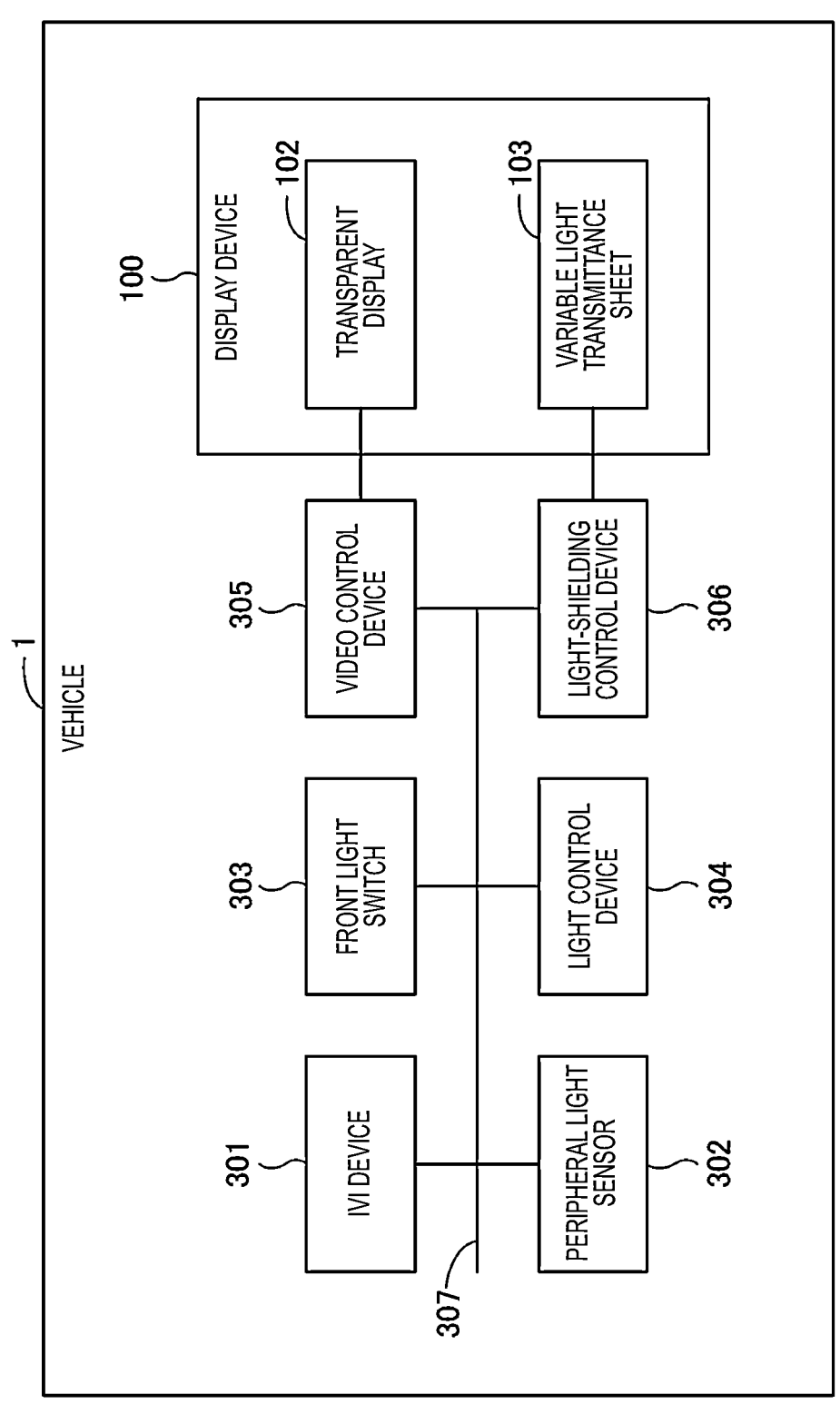
FIG. 8 is a block diagram illustrating an example of a device provided in the vehicle according to Embodiment 1.

FIG. 8 is a block diagram illustrating an example of a device provided in the vehicle according to Embodiment 1.

As illustrated in FIG. 8, the vehicle 1 includes an IVI device 301, a peripheral light sensor 302, a front light switch 303, a light control device 304, a video control device 305, a light-shielding control device 306, and a display device 100. As described above, the display device 100 includes at least the transparent display 102 and the variable light transmittance sheet 103.

The IVI device 301, the peripheral light sensor 302, the front light switch 303, the light control device 304, the video control device 305, and the light-shielding control device 306 can transmit and receive information to and from each other via an in-vehicle network 307. Examples of the in-vehicle network 307 include controller area network (CAN), local interconnect network (LIN), and FlexRay.

The IVI device 301 is a device that provides information related to the vehicle 1 and provides entertainment. IVI is an abbreviation of in-vehicle infotainment. For example, the IVI device 301 performs route guidance and/or display of road traffic information. For example, the IVI device 301 outputs a music and a video such as car audio, in-vehicle DVD, TV tuner, radio, and VOD. The IVI device 301 may be read as a control unit or an electronic control unit (ECU). The IVI device 301 may include a processor and a memory.

The peripheral light sensor 302 is a sensor that detects the brightness around the vehicle 1.

The light control device 304 is a device that controls turning on and off of a front light 8 mounted on the vehicle 1. For example, the light control device 304 performs control to turn on the front light 8 when it is determined based on a detection result of the peripheral light sensor 302 that the surroundings of the vehicle 1 are relatively dark (for example, when it is determined that the detected amount of light is smaller than a predetermined threshold value), and performs control to turn off the front light 8 when it is determined that the surroundings of the vehicle 1 are relatively bright (for example, when it is determined that the detected amount of light is equal to or larger than the predetermined threshold value). Accordingly, the front light 8 is automatically turned on and off according to the brightness around the vehicle 1.

The front light switch 303 is a switch for turning on and off the front light 8. The driver can turn on or off the front light 8 by operating the front light switch 303.

As described above, the video control device 305 causes the second display region 120 of the transparent display 102 to display the video 200 of the second shape. The video 200 may be either a still image or a moving image. The source of the video 200 may be provided from the IVI device 301.

The light-shielding control device 306 controls any region of the variable light transmittance sheet 103 to any light transmittance. For example, the light-shielding control device 306 sets the light-shielding region 130 having the third shape at the first light transmittance so as to overlap the second display region 120 or to protrude from the second display region 120 with respect to the variable light transmittance sheet 103 as described above.

The control of the video control device 305 and the light-shielding control device 306 may be executed in accordance with an instruction from the IVI device 301.

<Flowchart>

Figure 9:
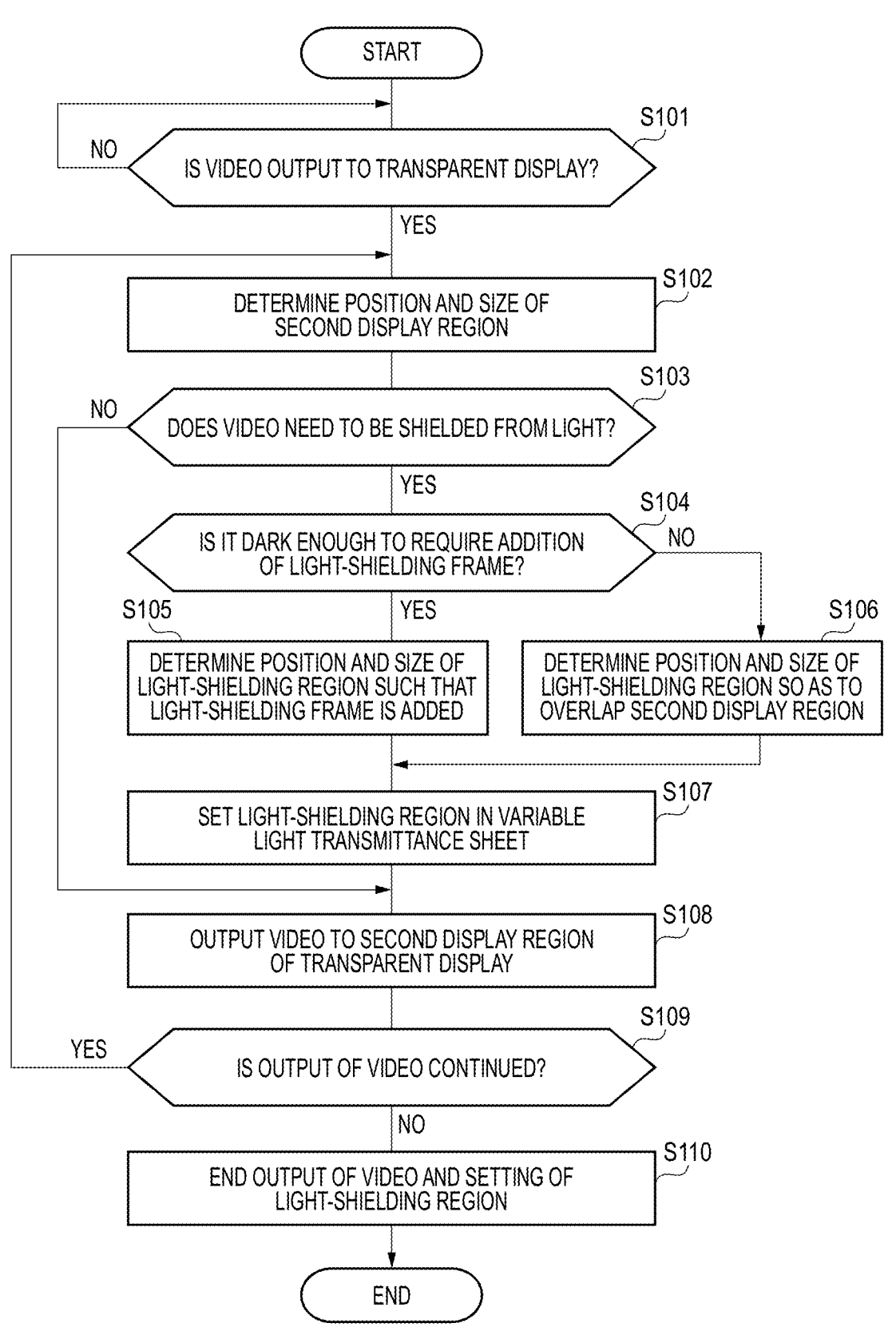
FIG. 9 is a flowchart illustrating an example of a control method of the vehicle and the display device according to Embodiment 1.

FIG. 9 is a flowchart illustrating an example of a control method of the vehicle 1 and the display device 100 according to Embodiment 1. Next, the control method of the vehicle 1 and the display device 100 will be described with reference to FIG. 9.

The IVI device 301 determines whether to output the video 200 to the transparent display 102 (S101). For example, when the passenger in the rear seat 22 instructs to display the video 200, or when information that the passenger in the rear seat 22 wants to know is generated, the IVI device 301 determines to output the video 200 to the transparent display 102.

When it is determined that the video 200 is not output to the transparent display 102 (S101: NO), the process returns to step S101.

When it is determined that the video 200 is output to the transparent display 102 (S101: YES), the IVI device 301 determines a position and a size of the second display region 120 with respect to the transparent display 102 (S102). The position and the size of the second display region 120 may be determined based on a position of the rear seat 22 on which the passenger is seated and/or a size of the second shape of the video 200.

The IVI device 301 determines whether the video 200 to be displayed needs to be shielded from light for the driver in the front seat 21 (S103). For example, when the video 200 to be displayed temporarily displays text information toward the passenger in the rear seat 22, the IVI device 301 may determine that the driver in the front seat 21 does not need to be shielded from light. This is because the video reflection light 202 caused by the temporary display of the text information is less likely to dazzle the driver and make the driver feel difficult to drive. For example, when the video 200 to be displayed is a moving image to be viewed by the passenger in the rear seat 22, the IVI device 301 may determine that the driver in the front seat 21 needs to be shielded from light. This is because the video reflection light 202 caused by the display of the moving image is highly likely to dazzle the driver and make the driver feel difficult to drive. A determination process of step S103 may be omitted, and the process may proceed to step S104.

When it is determined that the video 200 to be displayed does not need to be shielded from light for the driver in the front seat 21 (S103: NO), the IVI device 301 advances the process to step S108 to be described later.

When it is determined that the video 200 to be displayed needs to be shielded from light for the driver in the front seat 21 (S103: YES), the IVI device 301 advances the process to the next step S104.

The IVI device 301 determines whether the surroundings of the vehicle 1 are dark enough to require the addition of the light-shielding frame 135 (S104). For example, when the surroundings of the vehicle 1 are dark enough that the light control device 304 determines to turn on the front light 8 based on a detection result of the peripheral light sensor 302, or when the front light switch 303 is turned on by the driver, the IVI device 301 may determine that the surroundings of the vehicle 1 are dark enough to require the addition of the light-shielding frame 135. This is because, when the surroundings of the vehicle 1 are relatively dark, the video reflection light 202 is highly likely to dazzle the driver and make the driver feel difficult to drive. For example, when the surroundings of the vehicle 1 are bright enough that the light control device 304 determines to turn off the front light 8 based on a detection result of the peripheral light sensor 302, or when the front light switch 303 is turned off by the driver, the IVI device 301 may determine that the surroundings of the vehicle 1 are bright enough to not require the addition of the light-shielding frame 135. This is because, when the surroundings of the vehicle 1 are relatively bright, the video reflection light 202 is less likely to dazzle the driver and make the driver feel difficult to drive. A determination process of step S104 may be omitted, and the process may proceed to step S105.

When it is determined that the surroundings of the vehicle 1 are dark enough to require the addition of the light-shielding frame 135 (S104: YES), the IVI device 301 determines a position and a size of the light-shielding region 130 such that the light-shielding frame 135 is added around the second display region 120 (S105). Then, the process proceeds to step S107.

When it is determined that the surroundings of the vehicle 1 are bright enough to not require the addition of the light-shielding frame 135 (S104: NO), the IVI device 301 determines the position and the size of the light-shielding region 130 so as to overlap the second display region 120 (S106). Then, the process proceeds to step S107.

The IVI device 301 instructs the light-shielding control device 306 to set the light-shielding region 130 determined in step S105 or S106 in the variable light transmittance sheet 103 (S107). Upon receiving the instruction, the light-shielding control device 306 sets the light-shielding region 130 in the variable light transmittance sheet 103.

The IVI device 301 instructs the video control device 305 to output the video 200 to the second display region 120 determined in step S102 (S108). Upon receiving the instruction, the video control device 305 outputs the video 200 to the second display region 120 of the transparent display 102.

The IVI device 301 determines whether to continue outputting the video 200 to the transparent display 102 (S109). For example, the IVI device 301 determines not to continue outputting the video 200 when an instruction to end the playback of the video 200 is received from the passenger in the rear seat 22 or when the playback of the video 200 is completed. For example, when the playback of the video 200 is not completed, the IVI device 301 determines to continue outputting the video 200.

When it is determined to continue outputting the video 200 (S109: YES), the IVI device 301 returns the process to step S102. This is repeated, and in step S108, the video control device 305 is instructed to output the video 200 to the second display region 120, whereby the playback of the video 200 is continued.

When it is determined that the output of the video 200 is not continued (S109: NO), the IVI device 301 instructs the video control device 305 to end the output of the video 200 and instructs the light-shielding control device 306 to end the setting of the light-shielding region 130 (S110). Upon receiving the instruction, the video control device 305 ends the output of the video 200 to the second display region 120 of the transparent display 102. Upon receiving the instruction, the light-shielding control device 306 ends the setting of the light-shielding region 130 of the variable light transmittance sheet 103. That is, the light-shielding control device 306 sets a portion, which is the light-shielding region 130 of the variable light transmittance sheet 103, in the transmission region 140. Then, the process ends.

In the above process, it is determined whether to set the light-shielding frame 135 based on a feature of the video 200 to be displayed on the transparent display 102. Accordingly, as compared with a case in which the light-shielding frame 135 is normally set, it is possible to prevent the feeling of releasing the field of view of the passenger in the rear seat 22 from being impaired by the light-shielding region 130 since a wider range in which the transmission region 140 is set and a longer period in which the transmission region 140 is set.

SUMMARY OF PRESENT DISCLOSURE

The following techniques are disclosed from the above description of Embodiment 1.

Technique 1

The vehicle 1 includes: at least the first wheel 3A coupled to the vehicle body 2; the second wheel 3B coupled to the vehicle body 2; the third wheel 3C coupled to the vehicle body 2; and the fourth wheel 3D coupled to the vehicle body 2, and is capable of traveling in a predetermined direction using the first wheel 3A, the second wheel 3B, the third wheel 3C, and the fourth wheel 3D.

The vehicle body 2 includes: the floor surface portion 11 and the ceiling surface portion 12 arranged along the predetermined direction; the left side surface portion 13 connecting the floor surface portion 11 and the ceiling surface portion 12 and arranged on the left side surface along the predetermined direction; the right side surface portion 14 connecting the floor surface portion 11 and the ceiling surface portion 12 and arranged on the right side surface along the predetermined direction; the front surface portion 16 connecting the floor surface portion 11 and the ceiling surface portion 12 and arranged in the front portion 15 along the predetermined direction; the rear surface portion 18 connecting the floor surface portion 11 and the ceiling surface portion 12 and arranged in the rear portion 17 along the predetermined direction; at least one front seat 21 disposed closer to the front surface portion 16 side than the rear surface portion 18 on the floor surface portion 11; at least one rear seat 22 disposed closer to the rear surface portion 18 side than the front surface portion 16 on the floor surface portion 11; and the transparent display 102 disposed between the rear seat 22 and the front seat 21 and having the first display region 110 capable of outputting the video of the first shape.

The transparent display 102 includes the variable light transmittance sheet 103 which corresponds to at least the first display region 110, is disposed on at least the front seat 21 side, and has a variable light transmittance.

The vehicle control method for the vehicle 1 includes: a step of, when outputting the video 200 including the second display region 120 having the second shape in the first display region 110, setting the variable light transmittance sheet 103 to include the light-shielding region 130 having the third shape and having the first light transmittance and the transmission region 140 having the fourth shape other than the light-shielding region 130 and having the second light transmittance larger than the first light transmittance, and setting at least a part of the light-shielding region 130 to overlap the second display region 120.

Accordingly, the light of the video 200 in the second display region 120 is shielded by the light-shielding region 130, and thus it is possible to prevent the light of the video 200 from entering the field of view of the driver and affecting the driving.

Technique 2

In the vehicle control method according to Technique 1, the front surface portion 16 of the vehicle 1 includes a glass (for example, the front window 4) that allows the outside of the vehicle to be visually recognized from the front seat 21 in the predetermined direction.

According to Techniques 1 and 2, it is possible to prevent the light of the video 200 in the second display region 120 from being reflected by, for example, the front window 4 and entering the field of view of the driver to affect the driving.

Technique 3

In the vehicle control method according to Technique 1 or 2, the transparent display 102 includes at least the self-luminous display, and the variable light transmittance sheet 103 includes at least the liquid crystal shutter.

In this case, the video 200 is displayed on the transparent display 102 by self-emission, and the light-shielding region 130 is set by controlling the opening and closing of the liquid crystal shutter.

Technique 4

The vehicle control method according to Techniques 1 to 3 further includes: a step of, when outputting the video 200 including the second display region 120 having the second shape in the first display region 110, setting the variable light transmittance sheet 103 to include the light-shielding region 130 having the third shape and having the first light transmittance and the transmission region 140 having the fourth shape and having the second light transmittance, and setting the entire second display region 120 to overlap the light-shielding region 130.

Accordingly, the light of the video 200 in the second display region 120 is shielded by the light-shielding region 130, and thus it is possible to prevent the light of the video 200 from entering the field of view of the driver and affecting the driving. In addition, when the variable light transmittance sheet 103 includes the transmission region 140, it is possible to obtain the feeling of releasing the field of view of the passenger in the rear seat 22.

Technique 5

In the vehicle control method according to any one of Techniques 1 to 4, the second shape of the second display region 120 includes at least a first side (for example, the sides 121A, 121B, 121C, and 121D), the third shape of the light-shielding region 130 includes at least a second side (for example, the sides 131A, 131B, 131C, and 131D), the first side of the second shape of the second display region 120 is disposed corresponding to the second side of the third shape of the light-shielding region 130, and the second side of the third shape of the light-shielding region 130 is between the first side of the second shape of the second display region 120 and the transmission region 140.

Accordingly, the light-shielding region 130 is set such that at least a part thereof protrudes from the second display region 120, and the light of the video 200 in the second display region 120 is shielded by the light-shielding region 130, and thus it is possible to prevent the light of the video 200 from entering the field of view of the driver and affecting the driving.

Technique 6

In the vehicle control method according to Technique 5, the second side of the third shape of the light-shielding region 130 is separated from the first side of the second shape of the second display region 120 by a predetermined distance (for example, the frame distances 132A, 132B, 132C, and 132D).

Accordingly, the light-shielding region 130 larger than the second display region 120 is set, and the light of the video 200 in the second display region 120 is shielded by the light-shielding region 130, and thus it is possible to prevent the light of the video 200 from entering the field of view of the driver and affecting the driving.

Technique 7

In the vehicle control method according to any one of Techniques 1 to 6, the second shape of the second display region 120 includes a plurality of the first sides (for example, the sides 121A, 121B, 121C, and 121D), the third shape of the light-shielding region 130 includes a plurality of the second sides (for example, the sides 131A, 131B, 131C, and 131D), each of the plurality of first sides of the second shape of the second display region 120 is arranged corresponding to each of the plurality of second sides of the third shape of the light-shielding region 130, and each of the plurality of second sides of the third shape of the light-shielding region 130 is between each of the plurality of first sides of the second shape of the second display region 120 and the transmission region 140.

Accordingly, the light-shielding region 130 larger than the second display region 120 is set, and the light of the video 200 in the second display region 120 is shielded by the light-shielding region 130, and thus it is possible to prevent the light of the video 200 from entering the field of view of the driver and affecting the driving.

Technique 8

In the vehicle control method according to any one of Techniques 5 to 7, the first side of the second shape of the second display region 120 and the second side of the third shape of the light-shielding region 130 are arranged along a horizontal direction.

In this case, the first side of the second shape of the second display region 120 and the second side of the third shape of the light-shielding region 130 are along the horizontal direction.

Technique 9

In the vehicle control method according to any one of Techniques 5 to 8, the second shape of the second display region 120 is a first square, and the third shape of the light-shielding region 130 is a second square.

In this case, the second shape of the second display region 120 and the third shape of the light-shielding region 130 are squares.

Technique 10

In the vehicle control method according to any one of Techniques 1 to 9, the vehicle 1 includes the control unit (for example, the IVI device 301), and the control unit is configured to, when outputting the video 200 including the second display region 120 having the second shape in the first display region 110, set the variable light transmittance sheet 103 to include the light-shielding region 130 having the third shape and having the first light transmittance and the transmission region 140 having the fourth shape other than the light-shielding region 130 and having the second light transmittance, and set at least a part of the light-shielding region 130 to overlap the second display region 120.

Accordingly, the light of the video 200 in the second display region 120 is shielded by the light-shielding region 130, and thus it is possible to prevent the light of the video 200 from entering the field of view of the driver and affecting the driving.

Technique 11

The display device 100 includes: at least the first wheel 3A coupled to the vehicle body 2; the second wheel 3B coupled to the vehicle body 2; the third wheel 3C coupled to the vehicle body 2; and the fourth wheel 3D coupled to the vehicle body 2, and is set to be mounted on the vehicle 1 capable of traveling in the predetermined direction using the first wheel 3A, the second wheel 3B, the third wheel 3C, and the fourth wheel 3D.

The vehicle body 2 includes: the floor surface portion 11 and the ceiling surface portion 12 arranged along the predetermined direction; the left side surface portion 13 connecting the floor surface portion 11 and the ceiling surface portion 12 and arranged on the left side surface along the predetermined direction; the right side surface portion 14 connecting the floor surface portion 11 and the ceiling surface portion 12 and arranged on the right side surface along the predetermined direction; the front surface portion 16 connecting the floor surface portion 11 and the ceiling surface portion 12 and arranged in the front portion 15 along the predetermined direction; the rear surface portion 18 connecting the floor surface portion 11 and the ceiling surface portion 12 and arranged in the rear portion 17 along the predetermined direction; at least one front seat 21 disposed closer to the front surface portion 16 side than the rear surface portion 18 on the floor surface portion 11; at least one rear seat 22 disposed closer to the rear surface portion 18 side than the front surface portion 16 on the floor surface portion 11; and the display device 100 that includes the transparent display 102 disposed between the rear seat 22 and the front seat 21 and having the first display region 110 capable of outputting the video of the first shape. The transparent display 102 includes the variable light transmittance sheet 103 which corresponds to at least the first display region 110, is disposed on at least the front seat 21 side, and has a variable light transmittance.

In the display device 100, when outputting the video 200 including the second display region 120 having the second shape in the first display region 110, the variable light transmittance sheet 103 is set to include the light-shielding region 130 having the third shape and having the first light transmittance and the transmission region 140 having the fourth shape other than the light-shielding region 130 and having the second light transmittance larger than the first light transmittance, and at least a part of the light-shielding region 130 is set to overlap the second display region 120.

Accordingly, the light of the video 200 in the second display region 120 is shielded by the light-shielding region 130, and thus it is possible to prevent the light of the video 200 from entering the field of view of the driver and affecting the driving.

Technique 12

In the display device 100 according to Technique 11, the front surface portion 16 of the vehicle 1 includes a glass (for example, the front window 4) that allows the outside of the vehicle to be visually recognized from the front seat 21 in the predetermined direction.

According to Techniques 11 and 12, it is possible to prevent the light of the video 200 in the second display region 120 from being reflected by, for example, the front window 4 and entering the field of view of the driver to affect the driving.

Technique 13

In the display device 100 according to Technique 11 or 12, the transparent display 102 includes at least the self-luminous display, and the variable light transmittance sheet 103 includes at least the liquid crystal shutter.

In this case, the video 200 is displayed on the transparent display 102 by self-emission, and the light-shielding region 130 is set by controlling the opening and closing of the liquid crystal shutter.

Technique 14

In the display device 100 according to any one of Techniques 11 to 13, when outputting the video 200 including the second display region 120 having the second shape in the first display region 110, the variable light transmittance sheet 103 is set to include the light-shielding region 130 having the third shape and having the first light transmittance and the transmission region 140 having the fourth shape and having the second light transmittance, and the entire second display region 120 is set to overlap the light-shielding region 130.

Accordingly, the light of the video 200 in the second display region 120 is shielded by the light-shielding region 130, and thus it is possible to prevent the light of the video 200 from entering the field of view of the driver and affecting the driving. In addition, when the variable light transmittance sheet 103 includes the transmission region 140, it is possible to obtain the feeling of releasing the field of view of the passenger in the rear seat 22.

Technique 15

In the display device 100 according to any one of Techniques 1 to 14, the second shape of the second display region 120 includes at least a first side (for example, the sides 121A, 121B, 121C, and 121D), the third shape of the light-shielding region 130 includes at least a second side (for example, the sides 131A, 131B, 131C, and 131D), the first side of the second shape of the second display region 120 is disposed corresponding to the second side of the third shape of the light-shielding region 130, and the second side of the third shape of the light-shielding region 130 is between the first side of the second shape of the second display region 120 and the transmission region 140.

Accordingly, the light-shielding region 130 is set such that at least a part thereof protrudes from the second display region 120, and the light of the video 200 in the second display region 120 is shielded by the light-shielding region 130, and thus it is possible to prevent the light of the video 200 from entering the field of view of the driver and affecting the driving.

Technique 16

In the display device 100 according to Technique 15, the second side of the third shape of the light-shielding region 130 is separated from the first side of the second shape of the second display region 120 by a predetermined distance (for example, the frame distances 132A, 132B, 132C, and 132D).

Accordingly, the light-shielding region 130 larger than the second display region 120 is set, and the light of the video 200 in the second display region 120 is shielded by the light-shielding region 130, and thus it is possible to prevent the light of the video 200 from entering the field of view of the driver and affecting the driving.

Technique 17

In the display device 100 according to any one of Techniques 11 to 14, the second shape of the second display region 120 includes a plurality of the first sides (for example, the sides 121A, 121B, 121C, and 121D), the third shape of the light-shielding region 130 includes a plurality of the second sides (for example, the sides 131A, 131B, 131C, and 131D), each of the plurality of first sides of the second shape of the second display region 120 is arranged corresponding to each of the plurality of second sides of the third shape of the light-shielding region 130, and each of the plurality of second sides of the third shape of the light-shielding region 130 is between each of the plurality of first sides of the second shape of the second display region 120 and the transmission region 140.

Accordingly, the light-shielding region 130 larger than the second display region 120 is set, and the light of the video 200 in the second display region 120 is shielded by the light-shielding region 130, and thus it is possible to prevent the light of the video 200 from entering the field of view of the driver and affecting the driving.

Technique 18

In the display device 100 according to any one of Techniques 15 to 17, the first side of the second shape of the second display region 120 and the second side of the third shape of the light-shielding region 130 are arranged along a horizontal direction.

In this case, the first side of the second shape of the second display region 120 and the second side of the third shape of the light-shielding region 130 are along the horizontal direction.

Technique 19

In the display device 100 according to any one of Techniques 15 to 18, the second shape of the second display region 120 is a first square, and the third shape of the light-shielding region 130 is a second square.

In this case, the second shape of the second display region 120 and the third shape of the light-shielding region 130 are squares.

Technique 20

In the display device 100 according to any one of Techniques 11 to 19, the vehicle 1 includes the control unit (for example, the IVI device 301), and the control unit is configured to, when outputting the video 200 including the second display region 120 having the second shape in the first display region 110, set the variable light transmittance sheet 103 to include the light-shielding region 130 having the third shape and having the first light transmittance and the transmission region 140 having the fourth shape other than the light-shielding region 130 and having the second light transmittance, and set at least a part of the light-shielding region 130 to overlap the second display region 120.

Accordingly, the light of the video 200 in the second display region 120 is shielded by the light-shielding region 130, and thus it is possible to prevent the light of the video 200 from entering the field of view of the driver and affecting the driving.

Although the embodiment has been described above with reference to the accompanying drawings, the present disclosure is not limited to such an example. It is apparent to those skilled in the art that various modifications, modifications, substitutions, addition, deletions, and equivalents can be conceived within the scope described in the claims, and it is understood that the scope of the present disclosure includes these modifications. In addition, the constituent elements in the embodiment described above may be freely combined without departing from the gist of the invention.

INDUSTRIAL APPLICABILITY

The techniques of the present disclosure can be used for a transparent display capable of displaying a video.

CROSS-REFERENCE TO RELATED APPLICATIONS

This application is based on and claims priority under 35 USC 119 from Japanese Patent Application No. 2023-072554 filed on Apr. 26, 2023, the contents of which are incorporated herein by reference.

What is claimed is:

1. A vehicle control method for a vehicle, the vehicle including: at least a first wheel coupled to a vehicle body;

a second wheel coupled to the vehicle body;

a third wheel coupled to the vehicle body; and a fourth wheel coupled to the vehicle body, and the vehicle being capable of traveling in a predetermined direction using the first wheel, the second wheel, the third wheel, and the fourth wheel, the vehicle body including:

a floor surface portion and a ceiling surface portion arranged along the predetermined direction;

a left side surface portion connecting the floor surface portion and the ceiling surface portion and arranged on a left side surface along the predetermined direction;

a right side surface portion connecting the floor surface portion and the ceiling surface portion and arranged on a right side surface along the predetermined direction;

a front surface portion connecting the floor surface portion and the ceiling surface portion and arranged in a front portion along the predetermined direction;

a rear surface portion connecting the floor surface portion and the ceiling surface portion and arranged in a rear portion along the predetermined direction;

at least one front seat disposed closer to a front surface portion side than the rear surface portion on the floor surface portion;

at least one rear seat disposed closer to a rear surface portion side than the front surface portion on the floor surface portion; and a transparent display disposed between the rear seat and the front seat, having a first display region capable of outputting a video of a first shape, and including a variable light transmittance sheet, the variable light transmittance sheet corresponded to at least the first display region, being disposed on at least a front seat side, and having a variable light transmittance, and the vehicle control method comprising:

when outputting a video including a second display region having a second shape in the first display region, setting the variable light transmittance sheet to include a light-shielding region having a third shape and a transmission region having a fourth shape other than the light-shielding region, the light-shielding region having a first light transmittance, and the transmission region having a second light transmittance larger than the first light transmittance, and setting at least a part of the light-shielding region to overlap with the second display region.

2. The vehicle control method according to claim 1, wherein the front surface portion of the vehicle includes a glass that allows an outside of the vehicle to be visually recognized from the front seat in the predetermined direction.

3. The vehicle control method according to claim 1, wherein the transparent display includes at least a self-luminous display, and the variable light transmittance sheet includes at least a liquid crystal shutter.

4. The vehicle control method according to claim 1, further comprising:

when outputting the video including the second display region having the second shape in the first display region, setting the variable light transmittance sheet to include the light-shielding region having the third shape and having the first light transmittance and the transmission region having the fourth shape and having the second light transmittance, and setting the entire second display region to overlap the light-shielding region.

5. The vehicle control method according to claim 4, wherein the second shape of the second display region includes at least a first side, the third shape of the light-shielding region includes at least a second side, the first side of the second shape of the second display region is disposed corresponding to the second side of the third shape of the light-shielding region, and the second side of the third shape of the light-shielding region is between the first side of the second shape of the second display region and the transmission region.

6. The vehicle control method according to claim 5, wherein the second side of the third shape of the light-shielding region is separated from the first side of the second shape of the second display region by a predetermined distance.

7. The vehicle control method according to claim 4, wherein the second shape of the second display region includes a plurality of the first sides, the third shape of the light-shielding region includes a plurality of the second sides, each of the plurality of first sides of the second shape of the second display region is arranged corresponding to each of the plurality of second sides of the third shape of the light-shielding region, and each of the plurality of second sides of the third shape of the light-shielding region is between each of the plurality of first sides of the second shape of the second display region and the transmission region.

8. The vehicle control method according to claim 5, wherein the first side of the second shape of the second display region and the second side of the third shape of the light-shielding region are arranged along a horizontal direction.

9. The vehicle control method according to claim 5, wherein the second shape of the second display region is a first square, and the third shape of the light-shielding region is a second square.

10. The vehicle control method according to claim 1, wherein the vehicle includes a control unit, and when outputting the video including the second display region having the second shape in the first display region, the control unit sets the variable light transmittance sheet to include the light-shielding region having the third shape and having the first light transmittance and the transmission region having the fourth shape other than the light-shielding region and having the second light transmittance, and sets at least a part of the light-shielding region to overlap the second display region.

11. A display device mounted on a vehicle capable of traveling in a predetermined direction using a first wheel coupled to a vehicle body, a second wheel coupled to the vehicle body, a third wheel coupled to the vehicle body, and a fourth wheel coupled to the vehicle body, the display device comprising:

a transparent display disposed between a rear seat of the vehicle body and a front seat of the vehicle body and having a first display region capable of outputting a video of a first shape; and a variable light transmittance sheet which corresponds to at least the first display region, is disposed on at least the front seat side of the vehicle body, and has a variable light transmittance, and when outputting a video including a second display region having a second shape in the first display region, the variable light transmittance sheet is set to include a light-shielding region having a third shape and having a first light transmittance and a transmission region having a fourth shape other than the light-shielding region and having a second light transmittance larger than the first light transmittance, and at least a part of the light-shielding region is set to overlap with the second display region.

12. The display device according to claim 11, wherein the transparent display includes at least a self-luminous display, and the variable light transmittance sheet includes at least a liquid crystal shutter.

13. The display device according to claim 11, wherein when outputting the video including the second display region having the second shape in the first display region, the entire second display region is set to overlap with the light-shielding region.

14. The display device according to claim 13, wherein the second shape of the second display region includes at least a first side, the third shape of the light-shielding region includes at least a second side, the first side of the second shape of the second display region is disposed corresponding to the second side of the third shape of the light-shielding region, and the second side of the third shape of the light-shielding region is between the first side of the second shape of the second display region and the transmission region.

15. The display device according to claim 14, wherein the second side of the third shape of the light-shielding region is separated from the first side of the second shape of the second display region by a predetermined distance.

16. The display device according to claim 13, wherein the second shape of the second display region includes a plurality of the first sides, the third shape of the light-shielding region includes a plurality of the second sides, each of the plurality of first sides of the second shape of the second display region is arranged corresponding to each of the plurality of second sides of the third shape of the light-shielding region, and each of the plurality of second sides of the third shape of the light-shielding region is between each of the plurality of first sides of the second shape of the second display region and the transmission region.

17. The display device according to claim 14, wherein the first side of the second shape of the second display region and the second side of the third shape of the light-shielding region are arranged along a horizontal direction.

18. The display device according to claim 14, wherein the second shape of the second display region is a first square, and the third shape of the light-shielding region is a second square.

19. The display device according to claim 11, further comprising:

a control unit, when outputting the video including the second display region having the second shape in the first display region, the control unit sets the variable light transmittance sheet to include the light-shielding region having the third shape and having the first light transmittance and the transmission region having the fourth shape other than the light-shielding region and having the second light transmittance, and sets at least a part of the light-shielding region to overlap the second display region.

20. A displays system comprising:

a vehicle being capable of traveling in a predetermined direction; and a display device mounted on the vehicle, wherein the vehicle includes a control unit, the display device includes a transparent display disposed between a rear seat of the vehicle body and a front seat of the vehicle body and having a first display region capable of outputting a video of a first shape, the transparent display includes a variable light transmittance sheet which corresponds to at least the first display region, is disposed on at least the front seat side of the vehicle body, and has a variable light transmittance, when outputting a video including a second display region having a second shape in the first display region, the control unit sets the variable light transmittance sheet to include the light-shielding region having the third shape and having the first light transmittance and the transmission region having the fourth shape other than the light-shielding region and having the second light transmittance, and sets at least a part of the light-shielding region to overlap with the second display region.

* * * * *